(12) United States Patent
Bae et al.

(10) Patent No.: US 9,142,819 B2
(45) Date of Patent: Sep. 22, 2015

(54) SEPARATOR HAVING POROUS COATING LAYER, AND ELECTROCHEMICAL DEVICE CONTAINING THE SAME

(75) Inventors: Yoon-Jung Bae, Daejeon (KR); In-Chul Kim, Daejeon (KR); Seung-Taek Hong, Seoul (KR); Jong-Hwan Kim, Daejeon (KR); Han-Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/061,735

(22) PCT Filed: Sep. 3, 2009

(86) PCT No.: PCT/KR2009/004984
§ 371 (c)(1),
(2), (4) Date: Oct. 20, 2011

(87) PCT Pub. No.: WO2010/027203
PCT Pub. Date: Mar. 11, 2010

(65) Prior Publication Data
US 2012/0034509 A1    Feb. 9, 2012

(30) Foreign Application Priority Data

Sep. 3, 2008   (KR) .................. 10-2008-0086845
Sep. 3, 2009   (KR) .................. 10-2009-0083181

(51) Int. Cl.
*H01M 2/16*   (2006.01)
*H01M 10/052*   (2010.01)

(52) U.S. Cl.
CPC ............ *H01M 2/1686* (2013.01); *H01M 2/166* (2013.01); *H01M 2/1653* (2013.01); *H01M 10/052* (2013.01); *H01M 2200/30* (2013.01)

(58) Field of Classification Search
CPC . H01M 2/1646; H01M 2/1653; H01M 2/166; H01M 2/1686
USPC ........................ 429/142, 144, 145
See application file for complete search history.

(56) References Cited

U.S. PATENT DOCUMENTS

| | | | |
|---|---|---|---|
| 2002/0180082 A1* | 12/2002 | Chandavasu et al. ........... 264/41 |
| 2006/0246355 A1* | 11/2006 | Min et al. .................. 429/322 |
| 2007/0264577 A1 | 11/2007 | Katayama et al. |
| 2009/0111025 A1 | 4/2009 | Lee et al. |
| 2010/0068612 A1* | 3/2010 | Nishikawa .................. 429/129 |
| 2010/0136410 A1 | 6/2010 | Kawasoe et al. |
| 2010/0159318 A1 | 6/2010 | Sato et al. |
| 2010/0178544 A1* | 7/2010 | Nishikawa .................. 429/129 |
| 2010/0285348 A1 | 11/2010 | Murata et al. |

FOREIGN PATENT DOCUMENTS

| | | | | |
|---|---|---|---|---|
| EP | 1 146 576 A1 | 10/2001 | | |
| EP | 1 900 514 A1 | 3/2008 | | |
| JP | 1-186752 A | 7/1989 | | |
| JP | 9-156011 A | 6/1997 | | |
| JP | 2001-319634 A | 11/2001 | | |
| JP | 2002-367590 A | 12/2002 | | |
| JP | 2002355938 A | * 12/2002 | ............. | H01M 2/16 |
| JP | 2004-123791 A | 4/2004 | | |
| JP | 2005-112905 A | 4/2005 | | |
| JP | 2008-88284 A | 4/2008 | | |
| JP | 2008-123996 A | 5/2008 | | |
| JP | 2008-524824 A | 7/2008 | | |
| JP | 2008-192483 A | 8/2008 | | |
| JP | 2008-311221 A | 12/2008 | | |
| KR | 10-2006-0072065 A | 6/2006 | | |
| KR | 10-2007-0000231 A | 1/2007 | | |
| KR | 727248 B1 | * 6/2007 | ............. | H01M 2/14 |
| KR | 10-0775310 B1 | 8/2007 | | |
| KR | 2008010166 A | * 1/2008 | ............. | H01M 4/80 |
| KR | 10-0820162 B1 | 4/2008 | | |
| KR | 10-0899283 B1 | 5/2009 | | |
| KR | 10-0918751 B1 | 9/2009 | | |
| WO | WO 2006/068428 A1 | 6/2006 | | |
| WO | WO 2008/059806 A1 | 5/2008 | | |
| WO | WO 2008062727 A1 | * 5/2008 | ............. | H01M 2/16 |
| WO | WO 2008/093575 A1 | 8/2008 | | |
| WO | WO 2008/097013 A1 | 8/2008 | | |
| WO | WO 2008/149895 A1 | 12/2008 | | |
| WO | WO 2008149895 A1 | * 12/2008 | ............. | H01M 2/16 |

OTHER PUBLICATIONS

Machine translation for Park et al., KR 2008-010166 A.*
Machine translation for Kono et al., JP 2002-355938 A.*
"CAS # 12047-27-7, Barium Titanate, Barium Titanate(IV)." CAS # 12047-27-7, Barium Titanate, Barium Titanate(IV). chemBlink, n.d. Web. Dec. 20, 2012.*
"Nylons (Polyamide)." Plastipedia: The Plastics Encyclopedia. The British Plastics Federation (BPF), n.d. Web. Jul. 8, 2013.*
"CAS # 1344-28-1, Aluminum Oxide, Alpha-Alumina, Alpha-Alumina Trihydrate, Activated Alumina." ChemBlink: Online Database of Chemicals from Around the World, n.d. Web. Jul. 8, 2013.*

* cited by examiner

*Primary Examiner* — Edu E Enin-Okut
(74) *Attorney, Agent, or Firm* — Birch, Stewart, Kolasch & Birch, LLP

(57) ABSTRACT

A separator includes a monolayer-type polyolefin-based micro-porous film having a porosity of 40 to 60%, an average pore diameter of 60 nm or less, and an air permeability of 350 s/100 mL or less; and a porous coating layer formed on at least one surface of the micro-porous film and made of a mixture of a plurality of inorganic particles and a binder polymer. An electrochemical device having the above separator has excellent thermal stability and allows a high power while minimizing the occurrence of leak current.

13 Claims, No Drawings

SEPARATOR HAVING POROUS COATING LAYER, AND ELECTROCHEMICAL DEVICE CONTAINING THE SAME

TECHNICAL FIELD

The present invention relates to a separator used for an electrochemical device such as a lithium secondary battery, and an electrochemical device containing the same. More particularly, the present invention relates to a separator in which a porous coating layer made of a mixture of a binder polymer and inorganic particles is formed on at least one surface of a micro-porous film, and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, in the development of such batteries, designs of new electrodes and batteries to improve capacity density and specific energy are mainly studied.

Among currently used secondary batteries, lithium secondary batteries developed in early 1990's have a higher drive voltage and a much higher energy density than those of conventional batteries using a liquid electrolyte such as Ni-MH batteries, Ni—Cd batteries, and $H_2SO_4$—Pb batteries. For these reasons, the lithium secondary batteries have been advantageously used. In particular, since middle- or large-sized battery modules used for hybrid vehicles are desirably designed as small and light as possible, it is urgently demanded to design lithium secondary batteries with high power.

In addition, it is very important to ensure the safety of such electrochemical devices, particularly in consideration of influences or the like of the middle- or large-sized batteries to the human. The most important consideration is that the electrochemical device should not cause any damage to a user due to malfunction. In this aspect, when the electrochemical device is overheated to cause a run-away or the separator is damaged due to an external impact, the possibility of explosion is increased.

A polyolefin-based micro-porous film commonly used as a separator of an electrochemical device is extremely thermally shrunken at a temperature of 100° C. or above due to its material characteristics and the characteristics of its manufacturing process including elongation, which may cause a short between a cathode and an anode. Meanwhile, in order to prevent the insulation properties of the separator from being deteriorated due to leak current, porosity and pore size, and resultant air permeability are controlled to low levels, and thus ion conductivity is not so high, which becomes a factor of hindering realization of high-power batteries.

Thus, there is needed to develop a technique capable of increasing ion conductivity while improving thermal stability of a separator using a polyolefin-based micro-porous film and minimizing the generation of leak current.

Meanwhile, Korean laid-open patent publication Nos. 10-2006-0072065 and 10-2007-0000231 disclose a separator having a porous coating layer, which is made of a mixture of a binder polymer and filler particles such as inorganic particles and formed on at least one surface of a porous substrate having a plurality of pores such as a polyolefin-based micro-porous film. However, these documents just disclose the techniques relating to the improvement of thermal stability of a separator in accordance with the formation of a porous coating layer, but they do not teach the design of a porous substrate and correlations between the porous substrate and the porous coating layer, which may realize a high-power battery.

DISCLOSURE OF INVENTION

Technical Problem

Therefore, an object of the invention is to provide a separator capable of ensuring excellent thermal stability and increasing the output of an electrochemical device while minimizing the generation of leak current.

Another object of the present invention is to provide a high-power electrochemical device having the above separator.

Technical Solution

In one aspect of the present invention, there is provided a separator, which includes a monolayer-type polyolefin-based micro-porous film having a porosity of 40 to 60%, an average pore diameter of 60 nm or less, and an air permeability of 350 s/100 mL or less; and a porous coating layer formed on at least one surface of the micro-porous film and made of a mixture of a plurality of inorganic particles and a binder polymer.

In the separator of the present invention, the polyolefin-based micro-porous film preferably has an average pore diameter of 30 to 40 nm, and the separator preferably has an air permeability of the separator of 500 s/100 mL or less and an ion conductivity of $1.4 \times 10^{-3}$ S/cm or above.

In the separator of the present invention, a loading weight of the porous coating layer to the polyolefin-based micro-porous film is preferably 10 to 20 $g/m^2$.

The separator of the present invention, as described above, may be interposed between a cathode and an anode and then used for electrochemical devices such as lithium secondary batteries and super-capacitor devices.

Advantageous Effects

The separator according to the present invention may control a short circuit between a cathode and an anode, caused by inorganic particles present in a porous coating layer, when an electrochemical device is overheated due to the porous coating layer. In particular, the porous coating layer formed on a monolayer-type polyolefin-based micro-porous film having a high porosity according to the present invention further controls the shrinkage of a plurality of pores formed in the micro-porous film by means of the inorganic particles, so that the thermal shrinkage of the separator may be further lowered.

In addition, since porosity, air permeability, and pore diameter of the polyolefin film having great ion conductivity are controlled in a complementary way, it is possible to realize a battery that has a high power while minimizing the generation of leak current.

BEST MODE

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A separator according to the present invention includes a monolayer-type polyolefin-based micro-porous film having a porosity of 40 to 60%, an average pore diameter of 60 nm or less, and an air permeability of 350 s/100 mL or less; and a porous coating layer formed on at least one surface of the micro-porous film and made of a mixture of a plurality of inorganic particles and a binder polymer. Since the porous coating layer is used, the separator of the present invention suppresses a short circuit between a cathode and an anode by means of the inorganic particles present in the porous coating layer when an electrochemical device is overheated. In addition, by using the polyolefin-based micro-porous film having high porosity and low air permeability, it is possible to realize a high-power battery. At this time, the occurrence of leak current caused by the use of the polyolefin-based micro-porous film having high porosity and low air permeability is minimized by forming the porous coating layer and controlling the upper limit of porosity and the pore size of the micro-porous film. The porous coating layer formed on the monolayer-type polyolefin-based micro-porous film having a high porosity according to the present invention may further lower the thermal shrinkage of the separator since the inorganic particles further controls the shrinkage of a plurality of pores formed in the micro-porous film.

(a) Polyolefin-Based Micro-Porous Film

The polyolefin-based micro-porous film used as a substrate of the separator according to the present invention is a monolayer-type polyolefin-based micro-porous film. The polyolefin-based micro-porous film may be formed with polymers such as high-density polyethylene, low-density polyethylene, linear low-density polyethylene, ultrahigh molecular weight polyethylene, and polypropylene, solely or in mixture thereof. If the micro-porous film is formed as a multilayer film having two or more layers, the air permeability is deteriorated in comparison to the porosity, which is not suitable for high-power batteries.

The micro-porous film has a porosity of 40 to 60%. If the porosity is less than 40%, it is not easy to give an output suitable for high-power batteries. If the porosity is greater than 60%, it is not easy to suppress the generation of leak current, which increases the defect rate of the battery. The micro-porous film preferably has a porosity of 50 to 60%, more preferably 55 to 60%. Also, the micro-porous film has an average pore diameter of 60 nm or less, preferably 30 to 40 nm, and an air permeability of 350 s/100 mL or less. If the average pore diameter is greater than 60 nm, it is not easy to control the generation of leak current. If the air permeability is greater than 350 s/100 mL, it is not easy to give an output suitable for high-power batteries.

By using the polyolefin-based micro-porous film having the above features, it is possible to improve the output characteristics of batteries and control the degradation rate of the performance of batteries.

(b) Porous Coating Layer

The separator of the present invention includes the porous coating layer provided on at least one surface of the above monolayer-type polyolefin-based micro-porous film. The porous coating layer is formed with a mixture of a plurality of inorganic particles and a binder polymer. The plurality of inorganic particles is connected to each other by means of the binder polymer, and pores are formed among the inorganic particles. The inorganic particles serve as a kind of spacer that keeps a physical form of the porous coating layer.

The inorganic particles used for forming the porous coating layer are not specially limited if they are electrically and chemically stable. In other words, inorganic particles causing no oxidation or reduction reaction in an operating voltage range (for example, 0 to 5V based on Li/Li$^+$) of an electrochemical device may be used in the present invention without limitation. In particular, in a case where an inorganic particle with a high dielectric constant is used, it is possible to improve ion conductivity of the electrolyte since the high dielectric constant contributes to the increase of the degree of dissociation of electrolyte salt in a liquid electrolyte, for example lithium salt.

Due to the above reasons, it is preferred that the inorganic particles include high-dielectric inorganic particles having a dielectric constant of 5 or above, preferably 10 or above. The inorganic particle having a dielectric constant of 5 or above may be for example $BaTiO_3$, $Pb(Zr, Ti)O_3$ (PZT), $Pb_{1-x}La_xZr_{1-y}Ti_yO_3$ (PLZT), PB $(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or their mixtures, but not limitedly.

In addition, the inorganic particle may have lithium ion transferring capability, in other words the inorganic particle may have a function of carrying lithium ions without storing lithium though it contains lithium atoms. The inorganic particle having the lithium ion transferring capability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, or their mixtures, but not limitedly.

The average diameter of inorganic particles in the porous coating layer is not specially limited, but the average diameter is preferably in the range from 0.001 to 10 μ, if possible, in order to form a coating layer with a uniform thickness and ensure suitable porosity. If the average diameter is less than 0.001 μm, a dispersing property of inorganic particles may be deteriorated. If the average diameter is greater than 10 μm, the thickness of the porous coating layer may be increased, and thus the possibility of internal short circuit may be increased due to the excessively great pore size while a battery is charged or discharged.

In addition, the binder polymer contained in the porous coating layer may use any polymer which is commonly used for forming a porous coating layer on a micro-porous film in the related art. In particular, a polymer having a glass transition temperature ($T_g$) between −200° C. and 200° C. is preferably used because the mechanical properties such as flexibility and elasticity of a finally produced porous coating layer can be improved. This binder polymer plays a role of a binder that connects or stably fixes the inorganic particles with each other or with the non-woven fabric substrate.

Also, the binder polymer does not necessarily need to exhibit ionic conductivity. However, the ionic conductivity of the binder polymer can further improve the performance of an electrochemical device. Thus, it is preferred that the binder polymer has a dielectric constant as high as possible. In practice, the degree of dissociation of salts in an electrolyte is dependent on the dielectric constant of a solvent used in the electrolyte. Therefore, a higher dielectric constant of the binder polymer can lead to a higher degree of dissociation of salts in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 $Mpa^{1/2}$, more preferably between 15 and 25 $Mpa^{1/2}$ and between 30 and 45 $Mpa^{1/2}$. Accordingly, a hydrophilic polymer having many polar groups is preferred as the binder polymer over a hydrophobic polymer such as a polyolefin. A solubility parameter less than 15 $Mpa^{1/2}$ or exceeding 45 $Mpa^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, and so on.

A ratio of the inorganic particles to the binder polymer in the porous coating layer formed on the micro-porous film according to the present invention is preferably 50:50 to 99:1, more preferably from 70:30 to 95:5. If the ratio of the inorganic particles to the binder polymer is less than 50:50, the content of polymer is so great that the pore size and porosity of the porous coating layer may be decreased. If the content of inorganic particles exceeds 99 parts by weight, the peeling resistance of the porous coating layer may be weakened since the content of binder polymer is so small. The pore size and porosity of the porous coating layer are not specially limited, but the pore size is preferably 0.001 to 10 μm and the porosity is preferably 10 to 90%. The pore size and porosity are mainly dependent on the size of inorganic particles. For example, in a case where inorganic particles have a diameter of 1 μm or less, the formed pores are also approximately 1 μm or less. The pores as mentioned above are filled with electrolyte injected later, and the filled electrolyte plays a role of transferring ions. In a case where the pore size and porosity are respectively less than 0.001 μm and 10%, the porous coating layer may act as a resistance layer. In a case where the pore size and porosity are respectively greater than 10 μm and 90%, mechanical properties may be deteriorated.

A loading weight of the porous coating layer to the micro-porous film is preferably 10 to 20 $g/m^2$. If the loading weight is less than 10 $g/m^2$, a leak current may be generated more easily. If the loading weight is greater than 20 $g/m^2$, the thickness of the separator is increased, which may be not suitable for high-power batteries.

The separator according to the present invention in which the porous coating layer is formed on the monolayer-type polyolefin-based porous film having predetermined properties as mentioned above preferably has an air permeability of 500 s/100 mL or less and an ion conductivity of $1.4 \times 10^{-3}$ S/cm or above.

In addition, when the polyolefin-based micro-porous film and the separator having a porous coating layer formed thereon are kept in an oven at 150° C. for 30 minutes, a reduction ratio of the thermal shrinkage of the separator to the thermal shrinkage of the polyolefin-based micro-porous film is preferably 40% or above, more preferably 55% or above.

A preferable example of a method for manufacturing the separator according to the present invention will be described below, but the present invention is not limited thereto.

First, a monolayer-type polyolefin-based micro-porous film having a porosity of 40 to 60%, an average pore diameter of 60 nm or less, and an air permeability of 350 s/100 mL is prepared. The micro-porous film having the above configuration may be easily obtained by using a well-known production method of a polyolefin-based micro-porous film.

Subsequently, at least one surface of the micro-porous film is coated with a binder polymer solution in which inorganic particles are dispersed, and then dried to make a separator.

The binder polymer solution in which inorganic particles are dispersed may be produced by dissolving a binder polymer in a solvent to prepare a binder polymer solution and then adding and dispersing inorganic particles thereto. The solvent preferably has a solubility parameter similar to that of the binder polymer and a low boiling point. It will help uniform mixture and easy removal of the solvent afterward. Non-limiting examples of usable solvents include acetone, tetrahydrofuran, methylene chloride, chloroform, dimethylformamide, N-methyl-2-pyrrolidone (NMP), cyclohexane, and water, or their mixtures. The inorganic particles are preferably pulverized after being added to the binder polymer solution. At this time, the time required for pulverization is suitably 1 to 20 hours, and the particle size of the pulverized particles is preferably 0.001 and 10 μm, as mentioned above. Conventional pulverization methods may be used, and ball milling is particularly preferred.

The binder polymer solution in which inorganic particles are dispersed is applied to the micro-porous film with a humidity of 10 to 80% as an example and then dried. At this time any coating method well known in the art may be used. For example, various methods such as dip coating, die coating, roll coating, comma coating, or their combinations may be used. In addition, the porous coating layer may be formed on both surfaces of the micro-porous film or on any one surface thereof selectively.

The separator prepared as mentioned above according to the present invention is interposed between a cathode and an anode to make an electrochemical device. At this time, in a case where a polymer that is gellable at swelling in liquid electrolyte is used as a binder polymer component, after a battery is assembled using the separator, the injected electrolyte and the binder polymer may be reacted and then gellated.

The electrochemical device of the present invention may be any device in which electrochemical reactions may occur, and specific examples of the electrochemical devices include all kinds of primary batteries, secondary batteries, fuel cells, solar cells, and capacitors such as a super capacitor. In particular, among the secondary batteries, lithium secondary batteries such as a lithium metal secondary battery, a lithium ion secondary battery, a lithium polymer secondary battery, and a lithium ion polymer secondary battery are preferred. Such lithium secondary batteries are particularly suitable for vehicles such as hybrid vehicles and electric vehicles.

There is no special limitation in electrodes that may be used together with the separator of the present invention, and the electrode may be manufactured in a form that electrode active materials are united to electrode current collectors according to any common method well known in the art. Among the electrode active materials, cathode active material may adopt common cathode active material available for a cathode of conventional electrochemical devices. Particularly, the cathode active material preferably uses lithium manganese oxides, lithium cobalt oxides, lithium nickel oxides, lithium iron oxides, or lithium composite oxides thereof, not limitedly. Also, anode active material may adopt common anode active material available for a cathode of conventional electrochemical devices. Particularly, non-limiting examples of anode active materials are lithium intercalation materials such as lithium metal, lithium alloy, carbon, petroleum coke, activated carbon, graphite, or other carbonaceous materials. Non-limiting examples of the cathode current collector include a foil made of aluminum, nickel, or combinations thereof, and non-limiting examples of the anode current collector include a foil made of copper, gold, nickel, copper alloys, or combinations thereof.

The electrolyte useable in the present invention includes a salt represented by the formula of $A^+B^-$, wherein $A^+$ represents an alkali metal cation such as $Li^+$, $Na^+$, $K^+$ or their combinations, and $B^-$ represents an salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or their combinations. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures, but the electrolyte useable in the present invention is not limited to the above examples.

The electrolyte may be injected at a suitable step during the manufacturing process of a battery, according to the manufacturing process and desired properties of a final product. In other words, the electrolyte may be injected before a battery is assembled, during a final step of the assembly process of a battery, or the like.

To apply the separator of the present invention to a battery, a folding process and a laminating or stacking process of the separator and the electrode may be used in addition to a general winding process.

Mode for Invention

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Substrate Evaluation Method

Porosity was measured in accordance with ASTM D-2873. Air permeability was measured using Gurley type Densometer (No. 158), produced by Toyoseiki, in accordance with the JIS Gurley (Japanese Industrial Standard Gurley). In other words, the air permeability means time (second) taken for 100 cc of air to pass through a separator of 1 square inch under an air pressure of 4.8 inch. Meanwhile, as for the pore diameter, an aqua-pore method (non-mercury porosicentry) was used to measure distribution of pore sizes and an average diameter (μm) of pores.

EXAMPLE 1

Preparation of Separator

PVdF-CTFE (polyvinylidene fluoride-chlorotrifluoroethylene) copolymer and cyanoethyl pullulan were respectively added to acetone at a weight ratio of 10:2 and dissolved at 50° C. for about 12 hours to produce a polymer solution. Inorganic particles in which $Al_2O_3$ particles and $BaTiO_3$ particles were mixed at a weight ratio of 9:2 were added to the produced binder polymer solution so that a weight ratio of the binder polymer to the inorganic particles is 20:80, and then the inorganic particles were pulverized (into about 400 nm) and dispersed by ball milling for 12 hours or more to produce slurry. The slurry produced as mentioned above was applied to a polypropylene micro-porous film (monolayer type, with a porosity of 55%, an average pore diameter of 30 to 40 nm, and an air permeability of 250 s/100 mL) with a thickness of 25 μm by dip coating. The used porous coating layer had a loading weight of 15 g/m$^2$, and the air permeability of a finally produced separator was 370 s/100 mL.

Preparation of Anode 96 weight % of carbon powder serving as anode active material, 3 weight % of polyvinylidene fluoride (PVdF) serving as a binding agent, and 1 weight % of carbon black serving as a conductive material were added to N-methyl-2-pyrrolidone (NMP) serving as a solvent to produce an anode mixture slurry. The anode mixture slurry was applied to a copper (Cu) foil with a thickness of 10 μm serving as an anode current collector and then dried to produce an anode, and then the anode was roll-pressed.

Preparation of Cathode 90 weight % of lithium manganese composite oxide serving as cathode active material, 6 weight % of carbon black serving as a conductive material, and 4 weight % of polyvinylidene fluoride (PVdF) serving as a binding agent were added to N-methyl-2-pyrrolidone (NMP) serving as a solvent to produce a cathode mixture slurry. The cathode mixture slurry was applied to an aluminum (Al) foil with a thickness of 20 μm serving as a cathode current collector and then dried to produce a cathode, and then the cathode was roll-pressed.

Preparation of Battery

The prepared electrodes and separator prepared as above were used to produce a battery.

The produced battery was assembled by stacking and folding the cathode, the anode, and the separator, and an electrolyte (ethylene carbonate (EC)/ethylmethyl carbonate (EMC)=1/2 (volume ratio)) in which 1 mole of lithium hexafluorophosphate (LiPF$_6$)) was dissolved was injected to the assembled battery.

EXAMPLE 2

A separator and a battery were produced in the same way as the example 1, except that a weight ratio of the binder polymer and the inorganic particles is changed into 30:70.

COMPARATIVE EXAMPLE 1

A separator and a battery were produced in the same way as the example 1, except that a monolayer-type polypropylene micro-porous film having a porosity of 38%, an average pore diameter of 30 to 40 nm, and an air permeability of 400 s/100 mL was used. The finally produced separator had an air permeability of 550 s/100 mL.

COMPARATIVE EXAMPLE 2

A battery and a separator were produced in the same way as the example 1, except that a three-layered multilayer-type polypropylene micro-porous film (with a total thickness of 25 μm) having a porosity of 38%, an average pore diameter of 30 to 40 nm, and an air permeability of 660 s/100 mL was used. The finally produced separator had an air permeability of 940 s/100 mL.

COMPARATIVE EXAMPLE 3

A battery and a separator were produced in the same way as the example 1, except that a monolayer-type polypropylene micro-porous film having a porosity of 63%, an average pore diameter of 65 nm, and an air permeability of 150 s/100 mL was used. The finally produced separator had an air permeability of 350 s/100 mL.

Evaluation of Thermal Shrinkage

Thermal shrinkages (where the change of length in an MD direction before and after being stored in an oven at 150° C. for 30 minutes is expressed as a percentage) of the micro-porous films and the separators according to the example 1 and the comparative example 1 were measured. The measured results are shown in the following table 1.

TABLE 1

|  | Thermal shrinkage of micro-porous film | Thermal shrinkage of separator | Reduction rate of thermal shrinkage after the formation of porous coating layer |
| --- | --- | --- | --- |
| Example 1 | 28 | 10 | 64 |
| Comparative example 1 | 35 | 22 | 37 |

Seeing the above table 1, a reduction rate of thermal shrinkage after a porous coating layer was formed was greater at the example 1 where the micro-porous film had a high porosity, than the case at the comparative example 1. Thus, it could be understood that the thermal stability is more greatly improved according to the formation of the porous coating layer at the separator of the example 1.

Evaluation of Ion Conductivity

Ion conductivities of the batteries according to the examples 1 and 2 and the comparative examples 1 and 2 were measured. The measured results are shown in the following table 2.

TABLE 2

|  | Ion conductivity (S/cm) |
| --- | --- |
| Example 1 | $1.9 \times 10^{-3}$ |
| Example 2 | $1.6 \times 10^{-3}$ |
| Comparative example 1 | $1.3 \times 10^{-3}$ |
| Comparative example 2 | $1.1 \times 10^{-3}$ |

Evaluation of Output of Batteries

Charge and discharge DC resistances of the batteries according to the example 1 and the comparative example 1 were measured at SOC 50%. The relative outputs of the example 1 and the comparative example 1 are shown in the following table 3.

TABLE 3

|  | Discharge output % | Battery charge output |
| --- | --- | --- |
| Example 1 | 116 | 115 |
| Comparative example 1 | 100 | 100 |

As in the table 3, it could be found that the discharge and charge output characteristics of the battery according to the example 1 of the present invention are improved as much as 1 to 15% in comparison to that of the comparative example 1.

Evaluation of Occurrence Rate of Leak Current of Batteries 10 batteries were produced respectively in accordance with the example 1 and the comparative example 3. The number of batteries where a leak current occurs is recorded in the following table 4.

TABLE 4

|  | Number |
| --- | --- |
| Example 1 | 0 |
| Comparative example 4 | 6 |

Seeing the table 4, the batteries according to the comparative example 3 where the pore diameter and porosity exceeds the level given in the subject invention exhibit a high defective rate, but the batteries according to the example 1 of the present invention exhibit no defect, caused by the occurrence of leak current.

What is claimed is:

1. A separator, comprising:
a monolayer-type polyolefin-based micro-porous film having an air permeability of 350 s/100 mL or less; and
a porous coating layer formed on at least one surface of the micro-porous film and made of a mixture of a plurality of inorganic particles and a binder polymer,
wherein a weight ratio of the inorganic particles to the binder polymer in the porous coating layer is 50:50 to 99:1, and the air permeability of the separator is 500 s/100 mL or less, and
wherein the monolayer-type polyolefin-based micro-porous film has a porosity of about 55% and an average pore diameter of 30 to 40 nm.

2. The separator according to claim 1, wherein the separator has an ion conductivity of $1.4 \times 10^{-3}$ S/cm or above.

3. The separator according to claim 1, wherein the polyolefin-based micro-porous film is made of a polymer selected from the group consisting of high-density polyethylene, low-density polyethylene, linear low-density polyethylene, ultra-high molecular weight polyethylene, polypropylene, and mixtures thereof.

4. The separator according to claim 1, wherein a loading weight of the porous coating layer to the polyolefin-based micro-porous film is 10 to 20 g/m².

5. The separator according to claim 1, wherein the porous coating layer has a pore size of 0.001 to 10 μm and a porosity of 10 to 90%.

6. The separator according to claim 1, wherein the inorganic particles have an average diameter of 0.001 to 10 μm.

7. The separator according to claim 1, wherein the binder polymer has a solubility parameter of 15 to 45 Mpa$^{1/2}$.

8. The separator according to claim 1, wherein the binder polymer is a binder polymer selected from the group consisting of polyvinylidene fluoride-co-hexafluoropropylene, polyvinylidene fluoride-co-trichloroethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, and mixtures thereof.

9. The separator according to claim 1, wherein, when the polyolefin-based micro-porous film alone and the separator comprising the monolayer-type polyolefin-based film and the porous coating layer are kept in an oven at 150° C. for 30 minutes, a reduction ratio of the thermal shrinkage of the separator to the thermal shrinkage of the polyolefin-based micro-porous film is 40% or above.

10. The separator according to claim 1, wherein, when the polyolefin-based micro-porous film alone and the separator comprising the monolayer-type polyolefin-based film and the porous coating layer are kept in an oven at 150° C. for 30 minutes, a reduction ratio of the thermal shrinkage of the separator to the thermal shrinkage of the polyolefin-based micro-porous film is 55% or above.

11. An electrochemical device, which includes a cathode, an anode, and a separator interposed between the cathode and the anode, wherein the separator is a separator defined in the claim 1.

12. The electrochemical device according to claim 11, wherein the electrochemical device is a lithium secondary battery.

13. The electrochemical device according to claim 12, wherein the lithium secondary battery is a lithium secondary battery for vehicles.

* * * * *